(12) United States Patent
Kim et al.

(10) Patent No.: US 8,539,537 B2
(45) Date of Patent: Sep. 17, 2013

(54) METHOD FOR PROCESSING CONNECTION REQUEST OF A DISK PLAYER

(75) Inventors: Ki Won Kim, Sungnam-si (KR); Jea Yong Yoo, Seoul (KR); Woo Seong Yoon, Namyangioo-si (KR)

(73) Assignee: LG Electronics Inc., Seoul (KR)

( * ) Notice: Subject to any disclaimer, the term of this patent is extended or adjusted under 35 U.S.C. 154(b) by 1826 days.

(21) Appl. No.: 10/670,973

(22) Filed: Sep. 25, 2003

(65) Prior Publication Data

US 2004/0181816 A1    Sep. 16, 2004

(30) Foreign Application Priority Data

Mar. 6, 2003 (KR) .......................... 10-2003-0014164

(51) Int. Cl.
*H04N 7/173* (2011.01)

(52) U.S. Cl.
USPC ............. 725/110; 725/88; 725/109; 725/138; 725/139; 725/151; 386/65; 386/96; 386/125; 386/240; 386/248; 709/219; 709/231; 709/236

(58) Field of Classification Search
USPC ......... 725/138, 139, 109, 110, 151; 709/219, 709/231, 236; 386/65, 96, 125, 240, 248, 386/326, 330, 332, 355
See application file for complete search history.

(56) References Cited

U.S. PATENT DOCUMENTS

| | | | |
|---|---|---|---|
| 6,035,329 A * | 3/2000 | Mages et al. ................... | 709/217 |
| 6,453,420 B1 | 9/2002 | Collart | |
| 6,580,870 B1 * | 6/2003 | Kanazawa et al. ............ | 386/240 |
| 2001/0032265 A1 | 10/2001 | Tanaka | |
| 2002/0006094 A1 * | 1/2002 | Teramoto ................... | 369/53.21 |
| 2002/0078144 A1 | 6/2002 | Lamkin et al. | |
| 2002/0107909 A1 | 8/2002 | Eyer et al. | |
| 2002/0116455 A1 | 8/2002 | Mitchell et al. | |
| 2002/0181356 A1 * | 12/2002 | Watanabe et al. .......... | 369/47.16 |
| 2003/0001016 A1 | 1/2003 | Fraier et al. | |
| 2003/0001887 A1 | 1/2003 | Smith | |
| 2003/0021593 A1 * | 1/2003 | Otsuka et al. ................. | 386/126 |
| 2003/0028892 A1 * | 2/2003 | Gewickey et al. ............ | 725/110 |
| 2003/0055912 A1 * | 3/2003 | Martin et al. ................. | 709/218 |
| 2003/0086690 A1 * | 5/2003 | Chung et al. ..................... | 386/69 |
| 2003/0152366 A1 | 8/2003 | Kanazawa et al. | |
| 2003/0161615 A1 * | 8/2003 | Tsumagari et al. ............. | 386/95 |
| 2004/0073941 A1 * | 4/2004 | Ludvig et al. ................. | 725/110 |
| 2005/0044481 A1 * | 2/2005 | Collart ....................... | 715/500.1 |
| 2005/0251749 A1 * | 11/2005 | Lamkin et al. ................ | 715/719 |
| 2006/0117344 A1 * | 6/2006 | Lamkin et al. .................. | 725/38 |

FOREIGN PATENT DOCUMENTS

| | | |
|---|---|---|
| CN | 1732663 A | 2/2006 |
| EP | 1267352 A2 | 12/2002 |
| JP | 09-128408 A | 5/1997 |
| JP | 09-223096 A | 8/1997 |
| JP | 11-018048 A | 1/1999 |

(Continued)

*Primary Examiner* — Brian Pendleton
*Assistant Examiner* — Alan Luong
(74) *Attorney, Agent, or Firm* — Birch, Stewart, Kolasch & Birch, LLP

(57) ABSTRACT

A method for connecting a media player to a remote server is provided. The method comprises processing a request for connecting to an remote server while reproducing data recorded on an enhanced navigation medium, processing connection information recorded on the enhanced navigation medium to determine whether connection to the remote server is permitted, and requesting connection to the remote server, if connection to the remote server is permitted in accordance with the connection information.

32 Claims, 3 Drawing Sheets

(56) References Cited

FOREIGN PATENT DOCUMENTS

| | | |
|---|---|---|
| JP | 11-161663 A | 6/1999 |
| JP | 2000-249563 A | 9/2000 |
| JP | 2000-295578 A | 10/2000 |
| JP | 2002-132976 A | 5/2002 |
| JP | 2002-182969 A | 6/2002 |
| JP | 2002-342270 A | 11/2002 |
| JP | 2005-501363 | 1/2005 |
| JP | 2005-501364 A | 1/2005 |
| JP | 2006-502699 A | 1/2006 |
| KR | 10-20010044579 A | 6/2001 |
| RU | 2005-127931 | 2/2003 |
| RU | 2005-111230 | 2/2006 |
| WO | WO-99/48296 A1 | 9/1999 |
| WO | WO-2004/036575 A1 | 4/2004 |
| WO | WO-2004/036576 A1 | 4/2004 |
| WO | WO-2004/070723 A1 | 8/2004 |

\* cited by examiner

METHOD FOR PROCESSING CONNECTION REQUEST OF A DISK PLAYER

CROSS-REFERENCE TO RELATED APPLICATIONS

Pursuant to 35 U.S.C. §119(a), this application claims the benefit of earlier filing date and right of Korean Patent Application No. 10-2003-14164, filed on Mar. 6, 2003, the content of which is hereby incorporated by reference herein in its entirety.

BACKGROUND OF THE INVENTION

1. Field of the Invention

The present invention relates to a method for setting a playback environment for reproducing audio/video (A/V) data in an interactive or enhanced recording medium, such as an interactive digital versatile disk (also known as I-DVD or Enhanced Digital Versatile Disk (ENAV)), along with additional contents associated with the A/V data.

2. Description of the Related Art

High-density optical disks (e.g., digital versatile disks (DVDs)) are capable of recording and storing large-capacity digital data. The DVDs are large-capacity recording mediums capable of permanently recording and storing not only high-quality digital audio data, but also high-quality moving picture data.

A DVD includes a data stream recording area for recording a digital data stream, such as moving picture data and a navigation data recording area for recording navigation data needed for controlling playback of the moving picture data. A typical DVD player first reads the navigation data recorded on the navigation data recording area, if the DVD is seated in the player, stores the read navigation data in a memory provided in the player, and reproduces the moving picture data recorded on the data stream recording area using the navigation data.

The DVD player reproduces the moving picture data recorded on the DVD, such that a user can view and hear a movie recorded on the DVD. Information (control or additional information) associated with the playback of audio/video (A/V) data recorded on the DVD can be recorded as a file written in a hypertext markup language (HTML) on the DVD. Standardization work of an interactive digital versatile disk (I-DVD) is ongoing. The A/V data recorded on the I-DVD is reproduced according to the user's interactive request. Where I-DVDs are commercialized, the supply of contents through digital recording mediums will be more prevalent.

A method is being developed for seamlessly and continuously reproducing A/V data in an I-DVD, at the time of a synchronous playback operation for the A/V data and additional contents, i.e., ENAV data, associated with the A/V data recorded on the DVD. Various playback environments must be set before the data of the disk is reproduced so that the A/V data and the ENAV data on the disk can be seamlessly reproduced and outputted under limited resources of the player.

SUMMARY OF THE INVENTION

In accordance with one or more embodiments, a method for connecting a media player to a remote server comprises processing a request for connecting to an enhanced server while reproducing data recorded on an enhanced navigation medium; processing connection information recorded on the enhanced navigation medium to determine whether connection to the remote server is permitted; and requesting connection to the remote server, if connection to the remote server is permitted in accordance with the connection information.

The connection information is recorded in a start-up file that is read prior to reproduction of the data recorded on the enhanced navigation medium. The start-up file comprises information associated with a list of additional contents to be loaded before the data on the enhanced navigation medium is reproduced. The start-up file comprises information associated with a right to reproduce the data recorded on the enhanced navigation medium.

In some embodiments, the start-up file comprises information associated with a region code, a language of the additional contents, memory management, and a file to be processed after the start-up file is processed. The connection information comprises a list of servers to which the media player may connect or alternatively a list of servers to which the media player may not connect.

The data recorded on the enhanced navigation medium comprises audio/video (A/V) data. The data recorded on the enhanced navigation medium comprises additional contents associated with the A/V data, in some embodiments, for example. The A/V data and the additional contents are reproduced in synchronization.

The connection information comprises at least one connection address for connecting to the remote server. The start-up file comprises the connection information, wherein the start-up file comprises information associated with a walled-garden file comprising location information about at least one server.

The walled-garden file comprises information about at least one server to which the media player may connect to retrieve additional contents associated with the data recorded on the enhanced navigation medium. In one embodiment, the walled-garden file comprises information about at least one server to which the media player may not connect to retrieve additional contents associated with the data recorded on the enhanced navigation medium.

The walled-garden file comprises at least one entry associated with loading information that controls access to information available on the at least one server. The loading information comprises at least a condition for loading information available on the at least one server, and at least one of a language or a profile supported by the media player.

In one or more embodiments, a method for processing a connection request of an enhanced navigation media player comprises determining a current operating mode and connection limitation information, in response to a connection request for connecting the player to a remote server; and submitting the request to the remote server to establish a connection, based on the current operating mode and the connection limitation information.

The connection request is submitted, if the current operating mode is an enhanced navigation playback mode. Also, the connection request is submitted, if the connection limitation information provides permission for the remote server to be contacted. That is, the connection request is submitted, if the current operating mode is an interactive disk playback mode and if the connection limitation information indicates that the remote server may be contacted.

In certain embodiments, the connection limitation information is recorded in a start-up file residing on an enhanced navigation medium. The start-up file is read prior to the player reproducing data recorded on the enhanced navigation medium. The start-up file comprises information associated with a list of additional contents to be loaded before data recorded on the enhanced navigation medium is reproduced.

In accordance with another embodiment, an enhanced navigation media player for processing data recorded on a recording medium is provided. The player comprises an audio/video (A/V) player engine; and an enhance navigation (ENAV) engine, wherein if the recording medium is not an enhance navigation medium then A/V data recorded on the recording medium is reproduced by the A/V player engine, and wherein if the recording medium is an enhanced navigation medium, than a start-up file is loaded into a first memory so that the ENAV engine can extract connection information about at least one server with additional contents.

In one or more embodiments, the start-up file comprises information associated with a walled-garden list that provides the connection information about the at least one server. The start-up file may also comprise loading information that controls access to the additional contents available on the at least one server. The loading information comprises at least a condition for loading the additional contents available on the at least one server, a language condition to limit access to the additional contents available on the at least one server based on the language condition, a profile condition to limit access to the additional contents available on the at least one server based on the profile condition, and parental condition to limit access to the additional contents available on the at least one server based on the parental condition.

In some embodiments, an enhanced navigation recording medium comprises audio/video (A/V) data; and connection information for controlling access to additional contents available through at least one remote server, wherein the additional contents is reproduced in synchronization with the A/V data. The connection information comprises at least a condition for loading the additional contents available on the at least one server and a language condition to limit access to the additional contents available on the at least one server based on the language condition.

A profile condition to limit access to the additional contents available on the at least one server based on the profile condition, and parental condition to limit access to the additional contents available on the at least one server based on the parental condition, may be also included. In one embodiment, the connection information limits access to the at least one remote server or permits access to the at least one remote server.

In accordance with yet another embodiment, a method of playing back audio/video (A/V) data recorded on an enhanced navigation medium comprises identifying a playback mode; decoding a start-up file recorded on the enhanced navigation medium, if the playback mode identifies an enhanced navigation mode, wherein the start-up file comprises first and second information; decoding the first information to determine location of at least one remote server that provides access to additional contents to be played.

In one embodiment, a first enhanced navigation application is launched based on the decoded first and second information. The second information comprises at least one of a profile, language, and parental condition for loading the additional contents, for example.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DESCRIPTION OF THE PREFERRED EMBODIMENTS

Figure 1:
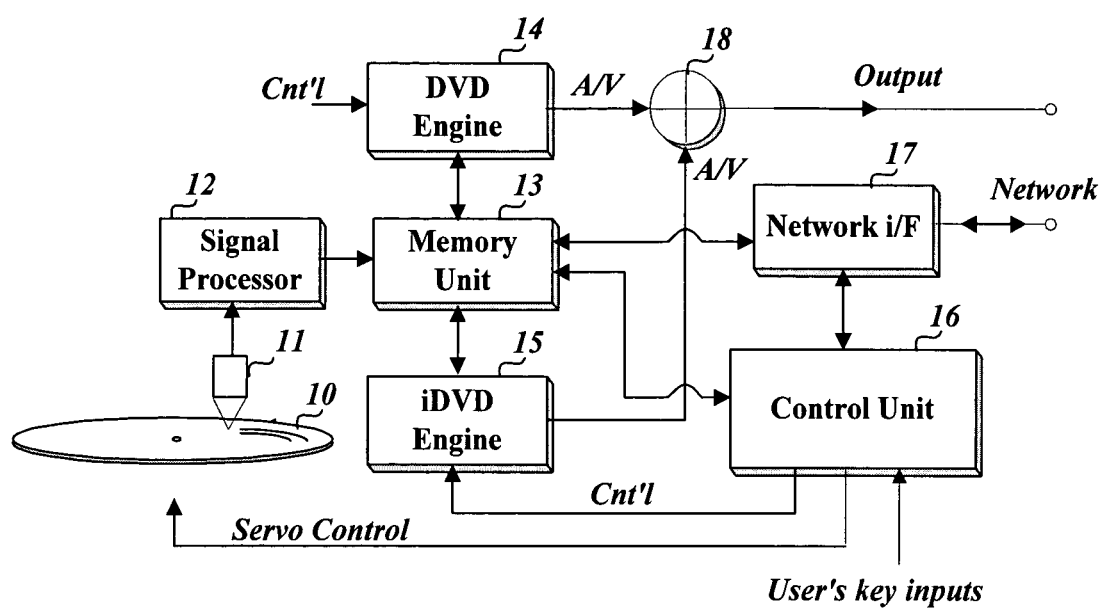
FIG. 1 is a block diagram of an optical disk device to which a method for setting a playback environment of an interactive disk, in accordance with one embodiment of the invention, is applied.

Referring to FIG. 1, in accordance with one embodiment of the present invention, an optical disk device comprises an optical pickup 11 that reads a signal recorded on an enhanced navigation recording medium such as an interactive digital versatile disk (I-DVD) 10. A signal processor 12 processes a read radio frequency (RF) signal and recovers digital data. A memory unit 13 stores the recovered data and externally received data. A DVD engine 14 decodes the data stored in the memory unit 13. An iDVD engine 15 interprets an information file stored in the memory unit 13, and processes certain additional contents (i.e., ENAV data).

A synthesizer 18 synthesizes and outputs an A/V signal from the DVD engine 14 and another A/V signal from the iDVD engine 15. A network interface 17 performs a network connection function and a web browser function. A control unit 16 sets a playback environment of the I-DVD 10 and controls the above-described components so that data of the I-DVD 10 can be reproduced along with the additional contents, under the set playback environment.

Figure 2:
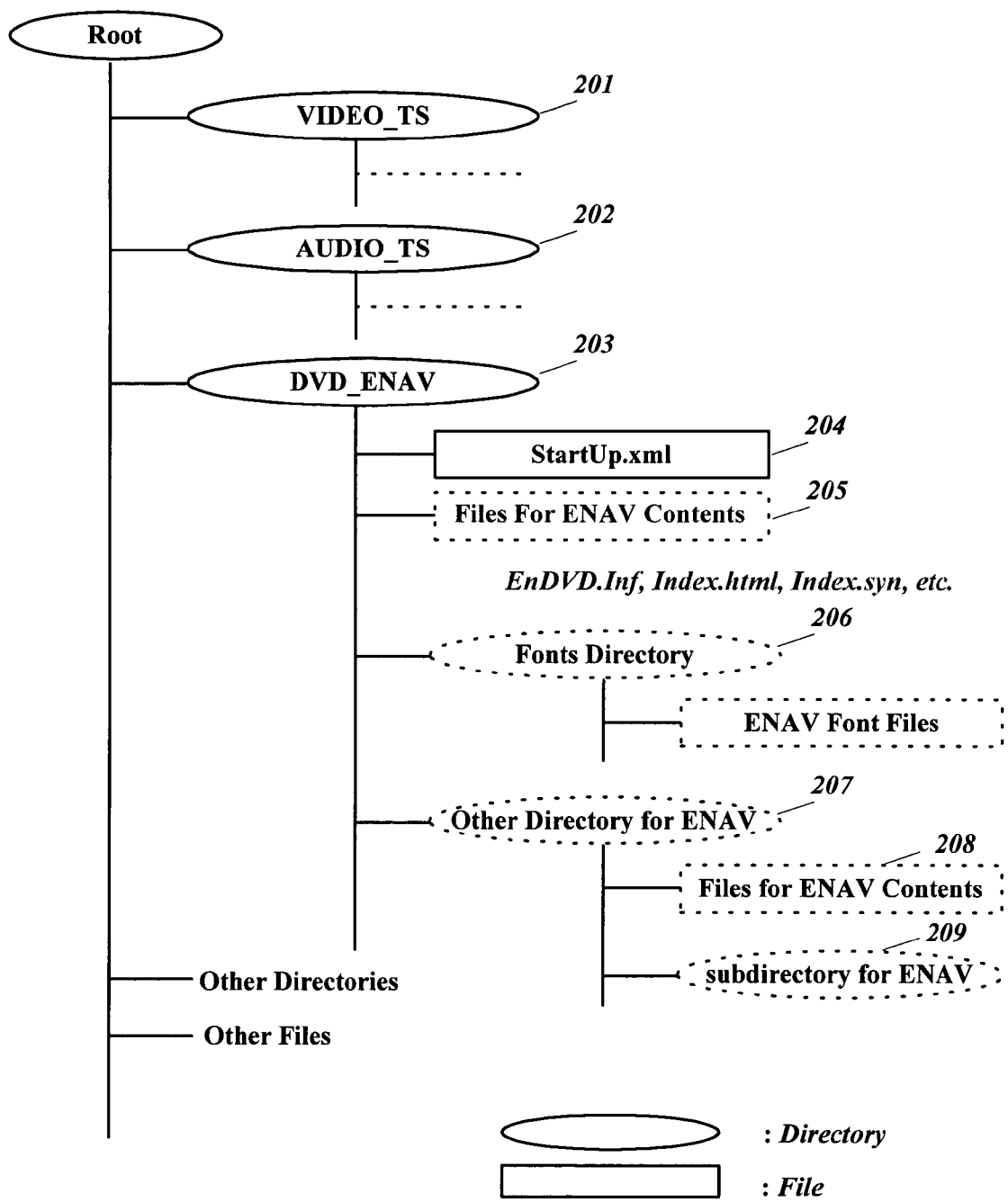
FIG. 2 is a schematic diagram illustrating a directory structure of an interactive digital versatile disk (I-DVD) in accordance with one embodiment of the invention.

An exemplary directory structure of the I-DVD 10 is shown in FIG. 2. An additional contents directory "DVD_ENAV" 203 is arranged under a root directory and comprises a start-up file "StartUp.mls" 204, for example. The start-up files comprises information about the system environment settings. In some embodiments, the environment is set before data of the I-DVD is reproduced.

Files 205 such as an information file "EnDVD.Inf", for example, for reproducing A/V data recorded on the I-DVD, an initial screen 25 setup file "index.html", for example, for playback, an synchronization file "index.syn", for example, for the synchronization between data items of different attributes may be part of the start-up file or settings. The directory "DVD ENAV" 203 may further comprise a fonts directory 206 storing font file for outputting a text of the additional contents.

In some embodiments, an additional contents directory 207 comprising the additional contents for providing additional A/V contents (i.e., ENAV data files 208, html files, image files, sound files, etc.) may be present. The additional contents directory 207 can comprise additional contents (for example, e.g., subdirectories 209), on the basis of a hierarchical structure, for example.

A video title set directory "Video_TS" 201, for example, comprising video data and an audio title set directory "Audio_TS" 202, for example, comprising audio data is arranged under the root directory, in some embodiments. An item of disk version information associated with the I-DVD and an item of contents manufacturer information are recorded in, for example, the "EnDvd.inf" file of the directory 203. Further, uniformed resource identifier (URI) information associated with a contents provider's server for providing, through a communication network, the additional contents information relating to A/V data to be read and reproduced from the I-DVD can be recorded in the directory 203.

Items of setup information for the initial screen setting at the time of reproducing the data of the interactive DVD can be recorded in the setup file "index.html" of the directory 203. Items of time stamp information for performing the synchronization between the A/V data and ENAV data to be read and reproduced from the I-DVD are recorded in the synchronization file "index.syn".

Before the A/V data of the I-DVD is reproduced, various information items for system environment setting are recorded in the start-up file "StartUp.mls", for example. The various information items may comprise information about contents to be loaded in a memory before the playback, location information of a source for providing the contents information, a parental ID indicating a right to access the recorded A/V data, the language of the additional contents, a website connection during the playback, memory management information, a file to be processed after the start-up file is processed, and a version of the start-up file.

Figure 3:
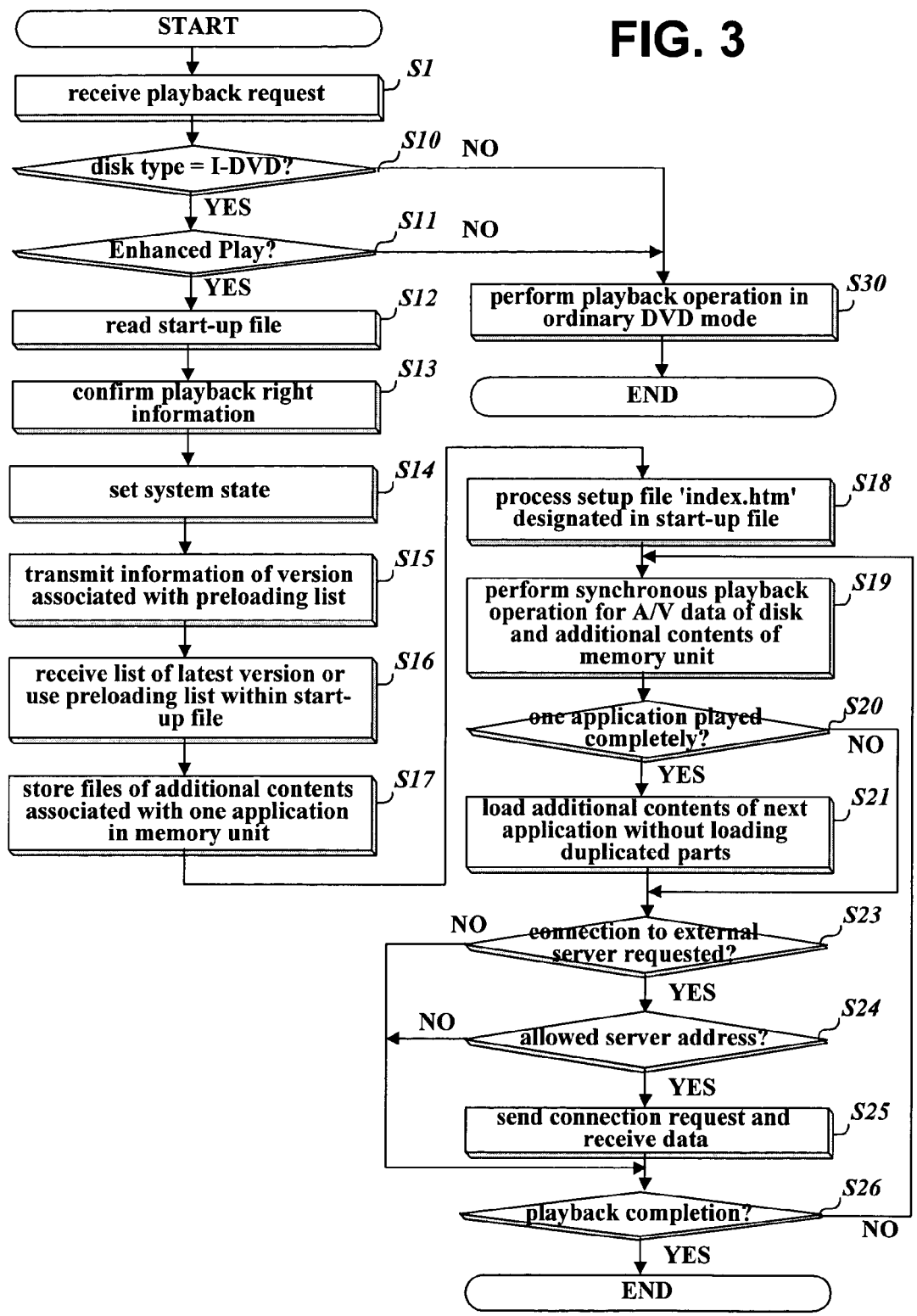
FIG. 3 is a flowchart illustrating a method for setting the playback environment of the interactive disk, in accordance with an embodiment of the invention.

Referring to FIG. 3, a method for reproducing the data of the I-DVD 10 is provided. If a disk is inserted and seated within the player shown in FIG. 1, at step S1, then the control unit 16 searches for a "StartUp.mls" or "EnDVD.Inf" file from a "DVD_ENAV" directory, for example. If a corresponding file is found, the seated disk is detected as an I-DVD, at step S10. Otherwise, the seated disk is detected as a general DVD.

If the seated disk is a general DVD, the control unit 16 performs a playback operation in a general DVD mode in response to a user request, at step S30. If the playback operation is completed, procedure ends. In the playback operation of the DVD mode, data reproduced from the disk is processed through the DVD engine 14 and the processed data is outputted as a video and audio signal.

On the other hand, if the seated disk is an I-DVD 10, it is determined whether data of the I-DVD is to be reproduced in an enhanced mode, at step S11. The enhanced mode is a synchronous playback mode for the additional data (i.e., ENAV data). The enhanced mode can be turned ON/OFF by the user. The initial setting corresponds to an ON state, in one embodiment. If the enhanced mode is in an OFF state, the above-described general DVD playback operation is performed at the above step S30, even if the seated disk is an I-DVD.

In certain embodiments, if the enhanced mode is in an ON state, the start-up file "StartUp.mls", for example, arranged under the "DVD_ENAV" directory is read, at step S12. The start-up file is stored in the memory unit 13, and the iDVD engine 15 is requested to interpret the start-up file. In one embodiment, the iDVD engine 15 interprets the start-up file "StartUp.mls" stored in the memory unit 13, and confirms a parental ID for authorization to reproduce data of the I-DVD at step S13. The iDVD engine then sets a system state, at step S14.

Information of the system state comprises information associated with a language to be used at a time of processing the ENAV data, website connection limitation (i.e., walled garden list), memory management, loading information, etc. For example, the system state can be defined as:

```
<conf type=language con=euc-kr>
<wgarden>http://www.warner.com</wgarden>
<memset>
<pload>36</pload>
</memset>
```

In this exemplary embodiment, The tag "<conf type>", for example, designates the Korean language as the used language. A tag "<wgarden>", for example, designates the website connection limitation or the walled garden list. The tag "<wgarden>", for example, indicates that connections to web sites other than "http://www.warner.com", for example, are not allowed. In conjunction with the memory setting, a tag "<pload>", for example, designates a memory space to be occupied. The tag "<pload>" indicates that a memory space of 36 Mbytes in the memory is occupied, in one or more embodiments. The loading information, for example defines a list of URIs to be preloaded into a memory space and can also provide and ENAV buffer configuration.

The website connection limitation information (i.e., the walled garden list") can comprise a plurality of website addresses. The website connection limitation information is provided to the network interface 17. Then, while the data of the I-DVD is reproduced, the website connection limitation information can be referred to by the user at a time of surfing the web, for example.

In certain embodiments, the walled garden list includes information about websites that can be accessed during the I-DVD playback. In other embodiments, the walled garden list includes information about websites that cannot be accessed during the I-DVD playback. Other implementations are also possible, where a combination of access permission or restrictions may be granted, according the content of the walled garden list.

The iDVD engine 15 confirms a version of a preloading list from the start-up file, and transmits the confirmed version information to a specified server through the network interface 17, at step S15. Location information of the specified server can be confirmed from information designated in the tag "<wgarden>", for example, or from URL information recorded in the "EnDvd.inf" file. A corresponding server receiving the version information transmits the preloading list of a latest version to the player, if the latest version higher than the received version exists in the server. In one embodiment, if the latest version higher than the received version does not exist, the corresponding server notifies the player that the received version is the latest version.

If the preloading list is downloaded, the memory unit 13 receives and stores the downloaded list. The downloaded list is used as preloading information. If the preloading list is not downloaded, the preloading list contained in the start-up file is used as the preloading information, at step S16. Contents recorded in the preloading list and certain ENAV data (e.g., html files, image files, sound files, text files, etc.) is stored in the memory space designated by the above-described tag "<pload>".

The preloading list can be defined in the following formats, in one or more embodiments. Files to be preloaded can vary according to a level of a right to reproduce the data of the DVD as described below or according to a region code.

```
<preload>
<unit no="1">
<DATA name="aaa" able="TRUE">
<INDEX>2th</INDEX>
```

```
        <TYPE>doc</TYPE>
        <src  t_ID="5"   t_lang="all">http://www.disney.com/a/b.htm
≦/src>
        <src  t_ID="1"   t_lang="all">http://www.disney.com/a/c.htm
</src>
        </DATA>
        ...
        </unit>
        ...
        </preload>
```

In the above example, "unit" means a section in which the ENAV data is seamlessly reproduced along with the A/V data linked to the ENAV data. All A/V data items recorded on the I-DVD (i.e., titles) can be configured by one or more applications. One application can be linked to one ENAV unit. An additional contents item to be preloaded for each unit (i.e., an ENAV data item) is defined by a tag "<DATA>" contained in the unit. In the above example, if a playback level (parental ID) is confirmed from the start-up file (i.e., t_ID, is "5") then a file of http://www.disney.com/a/b.htm, for example, is loaded in the memory unit 13.

If a playback level (parental ID) is confirmed from the start-up file (i.e., t_ID, is "1"), then a file of http://www.disney.com/a/c.htm, for example, is loaded in the memory unit 13. The file to be preloaded can be in a remote web site, according to the above-described example, but the file also can be designated as a file recorded in the specified directory of the seated disk. In some embodiments, data files for presentation of "html" files (e.g., image files), sound files, or banner files) are designated under a subsequent tag "<DATA>", for example. **

Thus, items designated in each tag "<DATA>" are, for example, read from the seated disk or received from a remote server. The read or received items are sequentially stored in the memory unit 13, in one embodiment. If all files designated within the unit "<unit>", for example, for one application have been stored, a preloading operation is completed, at step S17. If size of files designated within the one unit exceeds, for example, 36 Mbytes described above, the preloading operation is terminated, even if the preloading operation for another unit is not completed.

In one embodiment, the iDVD engine 15 confirms, from the start-up file, a file (e.g., a setup file "index.html") designated to be performed after the start-up file is performed. The iDVD engine 15 requests the control unit 16 to read the confirmed file from the I-DVD 10. If the setup file is loaded in the memory unit 13 in response to the request, the IDVD engine 15 interprets the file at step S18, and configures and outputs an initial screen by the user's selection.

If the user selects "playback start" from the initial screen, the control unit 16 requests the iDVD engine 15 to notify it of a confirmed playback right level. The control unit 16 compares the playback right level received from the iDVD engine 15 with a playback right level set in the player. If the playback right level set in the player is lower than the playback right level confirmed from the start-up file, the control unit 16 does not perform the requested playback, and configures and outputs a message indicating that the requested playback cannot be performed.

In one embodiment, if the playback right level set in the player is not lower than the playback right level confirmed from the start-up file, the control unit 16 begins to reproduce the data of the seated I-DVD 10. A region code set in the player is compared with a region code confirmed from the start-up file. If the region code set in the player is different from the region code confirmed from the start-up file, the playback operation is not performed. Otherwise, the playback operation can be performed.

If the playback operation is initiated, the control unit 16 buffers recorded A/V data in the memory unit 13 while driving the seated I-DVD 10. The buffered A/V data is decoded by the DVD engine 14 so that an A/V signal can be outputted. During this operation, the iDVD engine 15 reads the ENAV data preloaded in the memory unit 13, and performs a decoding operation to output an A/V signal. The A/V signal from the iDVD engine 15 is synthesized with an output signal from the DVD engine 14 by the synthesizer 18. The synthesized signals are outputted externally, at step S19.

In some embodiments, the iDVD engine 15 refers to synchronization information (e.g., linkage information between each file name and time) recorded in a synchronization file "index.syn" to synchronize files configuring the ENAV data with A/V data being reproduced from the I-DVD 10. When a latest version list associated with a preloading list designated in a start-up file "StartUp.mls" recorded on the I-DVD 10 is received from a remote server, a synchronization file "index.syn" is also received. The received synchronization file "index.syn" can be used in place of a synchronization file "index.syn" recorded in the I-DVD 10.

If ENAV data units for a current application preloaded in the memory unit 13 have been outputted, at step S20, the iDVD engine 15 notifies the control unit 16 that some or all of the ENAV data units have been outputted. In response to the notification, the control unit 16 stops the operation of the DVD engine 14. Then, the iDVD engine 15 refers to the above-described interpreted preloading list information, and preloads ENAV data, such as the ENAV units of a next application, in the memory unit 13.

When a file to be preloaded matches a file preloaded in the memory unit 13, for example, a corresponding file is not newly loaded. That is, the corresponding file is not read from the I-DVD 10 or not received from an external server. Data of a previous file stored in the memory unit 13 is used, at step S21, in one embodiment. The exclusion of a loading operation repeat can reduce a preloading time. If the ENAV data of next units has been loaded, then the control unit 16 is notified that the ENAV data has been completely loaded, and the playback operation is initiated from a point when it has been stopped.

The A/V data recorded on the disk and additional contents (ENAV data) associated with the A/V data are synchronized with each other and seamlessly outputted in a synchronized state. The above-described operation is continuously performed until the I-DVD playback is completed or a playback stop request is received from the user, at step S26.

If the user makes a specified website connection request, at step S23 in a synchronous playback or non-playback state, the control unit 16 provides input information to the network interface 17 and requests the network interface 17 to perform a specified website connection. Then, the network interface 17 determines whether a website address for the specified website connection is contained in previously received website connection limitation information, at step S24. If so, the network interface 17 sends a connection request with a received address, and receives a corresponding web page to store the received web page in the memory unit 13, at step S25. The iDVD engine 15 interprets the stored web page, and then a video signal is outputted on the basis of the interpreted web page.

If a website address for the specified website connection is not contained in previously received website connection limitation information, the network interface 17 confirms a current operating mode through the control unit 16. If the current operating mode is in the non-playback state or a general DVD playback state, then an operation is performed as in the case where the website address for the specified website connection is contained in the previously received website connection limitation information.

If the current operating mode is in an I-DVD playback state, the connection to the web site based on the request is not performed. At this time, the control unit 16 outputs a message indicating that the connection to the website based on the request cannot be performed in the I-DVD playback state.

In some embodiments, this website connection limitation information is set in the start-up file "StartUp.mls" by a manufacturer of the I-DVD such that a time delay or the memory's load caused by a certain website connection can be prevented in the I-DVD playback state.

Embodiments of the invention are described by way of example as applicable to systems and corresponding methods that provide a method for processing a connection request of a disk player. In this exemplary embodiment, logic code for performing these methods is implemented in the form of, for example, application software. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating on a computer or computers of any type. Additionally, software embodying the present invention may comprise computer instructions and stored on a recording medium of any form (e.g., ROM, RAM, magnetic media, punched tape or card, compact disk (CD), DVD, etc.). Furthermore, such software may also be transmitted in the form of a computer signal embodied in a carrier wave, or accessible through web pages provided on computers networks such as the Internet, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method for connecting a media player to a remote server, the method comprising:
   checking whether connecting to the remote server is required when reproducing data recorded on a storage medium in response to a transmitted version information related to the data to the remote server;
   analyzing connection information recorded on the storage medium to determine whether a connection to the remote server is permitted, if the connecting to the remote server is required to receive an additional content from the remote server, the additional content to be reproduced in synchronization with the data recorded on the storage medium, the connection information comprising a list of servers to which the media player may or may not connect to retrieve the additional content;
   checking memory management information recorded on the storage medium to designate a memory space to be preoccupied for storing the additional content; and
   determining whether to request the connection to the remote server, based on a result of the analyzing,
   wherein the determining step includes performing the connection to the remote server, if the connection to the remote server is permitted, in accordance with the connection information,
   the determining step further includes identifying a current operating mode and determining whether to request the connection to the remote server, based on a result of the identifying, the current operating mode being distinguished by a playback state of either a general storage medium or an interactive storage medium, and the connection to the remote server is not performed if the current operating mode is the playback state of the interactive storage medium, and the connection to the remote server is performed if the current operating mode is the playback state of the general storage medium or a non-playback state, and
   wherein retrieving of the additional content through the connection to the remote server is terminated if a size of the additional content exceeds the preoccupied memory space according to the memory management information.

2. The method of claim 1, wherein the connection information is included in a start-up file that is read prior to reproduction of the data recorded on the storage medium, and the method further comprises:
   preloading the start-up file prior to the reproducing of the data recorded on the storage medium.

3. The method of claim 2, wherein the start-up file comprises information associated with a list of additional contents to be loaded before the data recorded on the storage medium is reproduced.

4. The method of claim 2, wherein the start-up file comprises at least one of information associated with a right to reproduce the data recorded on the storage medium, information associated with a region code, information associated with a language of additional contents, information associated with memory management, and information associated with a file to be processed after the start-up file is processed.

5. The method of claim 1, further comprising:
   receiving data from the remote server, if the connection to the remote server is performed.

6. The method of claim 5, wherein the data received from the remote server includes a corresponding web page information.

7. The method of claim 6, further comprising:
   outputting the web page information.

8. The method of claim 1, wherein the data recorded on the storage medium comprises audio/video (A/V) data and/or additional contents associated with the A/V data, and the method further comprises:

reproducing the A/V data and the additional contents in synchronization.

9. The method of claim 1, wherein the connection information comprises at least one entry associated with loading information that controls access to information available on at least one server.

10. The method of claim 9, wherein the loading information comprises at least a condition for loading the information available on the at least one server.

11. The method of claim 10, wherein the loading information comprises at least one of a language or a profile supported by the media player.

12. An apparatus for connecting a media player to a remote server, the apparatus comprising:

a signal processor;

a memory; and a control unit configured to control the signal processor and the memory, the control unit configured to check whether connecting to a remote server is required to receive an additional content from the remote server in response to a transmitted version information related to the data to the remote server, the additional content to be reproduced in synchronization with data recorded on a storage medium, analyze connection information recorded on the storage medium to determine whether a connection to the remote server is permitted, if the connecting to the remote server is required to reproduce the data recorded on the storage medium, the connection information comprising a list of servers to which the media player may or may not connect to retrieve the additional content, check memory management information recorded on the storage medium to designate a memory space to be preoccupied for storing the additional content; and determine whether to request the connection to the remote server, based on the analyzed result, wherein the control unit is further configured to perform the connection to the remote server, if the connection to the remote server is permitted, in accordance with the connection information, wherein the control unit is configured to identify a current operating mode and determine whether to request the connection to the remote server, based on a result of the identifying, the current operating mode being distinguished by a playback state of either a general storage medium or an interactive storage medium, and the connection to the remote server is not performed if the current operating mode is the playback state of the interactive storage medium, and the connection to the remote server is performed if the current operating mode is the playback state of the general storage medium or a non-playback state, and wherein the control unit terminates retrieving of the additional content through the connection to the remote server if a size of the additional content exceeds the preoccupied memory space according to the memory management information.

13. The apparatus of claim 12, wherein the connection information is included in a start-up file that is read prior to reproduction of the data recorded on the storage medium, and the control unit is further configured to preload the start-up file prior to reproducing the data recorded on the storage medium.

14. The apparatus of claim 13, wherein the start-up file comprises information associated with a list of additional contents to be loaded before the data recorded on the storage medium is reproduced, and wherein the control unit is further configured to control the memory to load the additional contents.

15. The apparatus of claim 12, wherein the control unit is further configured to receive data from the remote server through an interface, if the connection to the remote server is performed.

16. The apparatus of claim 15, wherein the data received from the remote server includes a corresponding web page information, and the control unit is further configured to output the web page information.

17. The apparatus of claim 12, wherein the data recorded on the storage medium comprises audio/video (A/V) data and/or additional contents associated with the A/V data, and the control unit is further configured to reproduce the A/V data and the additional contents in synchronization.

18. The apparatus of claim 12, wherein the connection information comprises at least one entry associated with loading information that controls access to information available on at least one server, and wherein the control unit is further configured to control the access to information according to the entry.

19. The apparatus of claim 18, wherein the loading information comprises at least a condition for loading the information available on the at least one server, and wherein the control unit is further configured to control the memory to load the information according to the loading information.

20. The apparatus of claim 19, wherein the loading information comprises at least one of a language or a profile supported by the media player.

21. The method of claim 1, further comprising determining whether the additional content of the storage medium is to be reproduced in an enhanced mode, if the storage medium is determined to be one allowing interaction with the additional contents, the enhanced mode being a synchronous playback mode for the additional contents.

22. The apparatus of claim 12, wherein the control unit is further configured to determine whether the additional content of the storage medium is to be reproduced in an enhanced mode, if the storage medium is determined to be one allowing interaction with the additional contents, the enhanced mode being a synchronous playback mode for the additional contents.

23. A method for connecting a media player to a specified website connection, the method comprising:

checking whether a website address for the specified website connection is contained in previously received website connection limitation information;

analyzing a current operating mode of the media player if the website address for the specified website connection is not contained in the previously received website limitation information;

determining whether to request the connection to the specified website based on a result of the analyzing; and checking memory management information recorded on a storage medium to designate a memory space to be preoccupied for storing an additional content, wherein the determining step includes performing the connection to the specified website if the current operating mode is a non-playback state or a general storage medium playback state, and not performing the connection to the specified website if the current operating mode is an interactive storage medium playback state, and wherein retrieving of the additional content through a connection to a remote server is terminated if a size of the additional content exceeds the preoccupied memory space according to the memory management information.

24. The method of claim 23, further comprising:
outputting a message indicating that the connection to the specified website cannot be performed during the interactive storage medium playback state.

25. The method of claim 23, further comprising:
receiving a corresponding web page from the specified website if the connection to the specified website is performed.

26. The method of claim 25, further comprising:
interpreting the received web page to output a video signal on the basis of the interpreted web page.

27. The method of claim 23, wherein the checking step includes performing the connection to the specified website if the website address for the specified website connection is contained in the previously received website limitation information.

28. An apparatus for connecting a media player to a specified website connection, the apparatus comprising:
a signal processor;
a memory; and
a control unit configured to control the signal processor and the memory, the control unit configured to
check whether a website address for the specified website connection is contained in previously received website connection limitation information;
analyze a current operating mode of the media player if the website address for the specified website connection is not contained in the previously received website limitation information;
determine whether to request the connection to the specified website based on a result of the analyzing; and
check memory management information recorded on a storage medium to designate a memory space to be preoccupied for storing an additional content, wherein the control unit is configured to perform the connection to the specified website if the current operating mode is a non-playback state or a general storage medium playback state, and not to perform the connection to the specified website if the current operating mode is an interactive storage medium playback state, and wherein the control unit terminates retrieving of the additional content through a connection to a remote server if a size of the additional content exceeds the preoccupied memory space according to the memory management information.

29. The apparatus of claim 28, wherein the control unit is further configured to output a message indicating that the connection to the specified website cannot be performed during the interactive storage medium playback state.

30. The apparatus of claim 28, wherein the control unit is further configured to receive a corresponding web page from the specified website through an interface if the connection to the specified website is performed.

31. The apparatus of claim 30, wherein the control unit is further configured to interpret the received web page to output a video signal on the basis of the interpreted web page.

32. The apparatus of claim 28, wherein the control unit is further configured to perform the connection to the specified website if the website address for the specified website connection is contained in the previously received website limitation information.

* * * * *